(12) United States Patent
Drever

(10) Patent No.: US 9,138,942 B2
(45) Date of Patent: Sep. 22, 2015

(54) COMPOSITE STRUCTURE MANUFACTURING METHOD AND APPARATUS

(71) Applicant: Michael Drever, Houston, TX (US)

(72) Inventor: Michael Drever, Houston, TX (US)

(73) Assignee: EXPANDABLE STRUCTURES, LLC, Houston, TX (US)

( * ) Notice: Subject to any disclaimer, the term of this patent is extended or adjusted under 35 U.S.C. 154(b) by 191 days.

(21) Appl. No.: 14/016,200

(22) Filed: Sep. 2, 2013

(65) Prior Publication Data

US 2014/0001670 A1  Jan. 2, 2014

Related U.S. Application Data

(63) Continuation-in-part of application No. 12/618,721, filed on Nov. 14, 2009, now Pat. No. 8,522,663.

(51) Int. Cl.
| | |
|---|---|
| *B29C 70/38* | (2006.01) |
| *F41H 5/04* | (2006.01) |
| *F41H 5/24* | (2006.01) |
| *B29C 70/44* | (2006.01) |

(52) U.S. Cl.
CPC ............. *B29C 70/38* (2013.01); *B29C 70/44* (2013.01); *F41H 5/04* (2013.01); *F41H 5/0478* (2013.01); *F41H 5/0492* (2013.01); *F41H 5/24* (2013.01)

(58) Field of Classification Search
CPC .... B29C 70/44; B29C 70/742; B29C 70/021; B29C 70/382; B29C 70/38; B29C 2793/0018; B29C 73/34; B29C 37/0075; B29C 70/386
See application file for complete search history.

(56) References Cited

U.S. PATENT DOCUMENTS

| | | | | |
|---|---|---|---|---|
| 3,072,520 | A * | 1/1963 | Groth | 156/213 |
| 3,180,011 | A * | 4/1965 | Heuer | 29/890.042 |
| 3,641,230 | A * | 2/1972 | Jenks | 264/152 |
| 3,663,346 | A * | 5/1972 | Schoen | 428/116 |
| 3,793,791 | A * | 2/1974 | Wootten | 52/789.1 |
| 3,927,817 | A * | 12/1975 | Hamilton et al. | 228/157 |
| 3,938,963 | A * | 2/1976 | Hale | 428/582 |
| 3,998,684 | A * | 12/1976 | McRight | 156/253 |
| 4,304,821 | A * | 12/1981 | Hayase et al. | 428/593 |
| 4,451,377 | A * | 5/1984 | Luxemburg | 210/708 |
| 4,632,296 | A * | 12/1986 | Mansbridge et al. | 228/157 |
| 4,946,526 | A * | 8/1990 | Petty-Galis et al. | 156/155 |
| 5,118,555 | A * | 6/1992 | Horovitz | 428/178 |

(Continued)

*Primary Examiner* — Matthew Daniels
(74) *Attorney, Agent, or Firm* — Carrie A. Boone, P.C.

(57) ABSTRACT

A manufacturing apparatus employs three-dimensional (3D) printing technology and computer numerical controlled (CNC) positioning technology that creates composite structures of any size. The composite structures exhibit predefined characteristics suitable for different applications. The composite structures consist of plastic sheathing melded together to form bladders, as well as fabric impregnated with one or more resin-based compounds. The composite structures assume any of a myriad of predefined shapes. The composite structures exhibit fire-resistance, water-resistance, water containment, phase-change capability, ballistic protection, low weight, and may further be operable as a solar panel or be electrically conductive. The composite structures are optionally constructed with vias or pathways, through which pipes, electrical conduit, and other building materials may be threaded. The 3D printing and CNC technologies create the composite structures by printing them, already inpregnated and selectively cured. The composite structures are optionally inflated so as to take on an intended shape.

8 Claims, 18 Drawing Sheets

(56) References Cited

U.S. PATENT DOCUMENTS

| | | | |
|---|---|---|---|
| 5,139,887 A * | 8/1992 | Sutton | 428/586 |
| 5,255,834 A * | 10/1993 | Bendersky | 224/657 |
| 5,257,429 A * | 11/1993 | Genis | 5/636 |
| 5,454,895 A * | 10/1995 | Imparato | 156/156 |
| 5,687,900 A * | 11/1997 | Zaccone et al. | 228/173.6 |
| 5,710,414 A * | 1/1998 | Matsen et al. | 219/633 |
| 5,715,644 A * | 2/1998 | Yasui | 52/784.14 |
| 5,994,666 A * | 11/1999 | Buldhaupt et al. | 219/121.64 |
| 6,264,880 B1 * | 7/2001 | Elmer et al. | 264/572 |
| 6,743,504 B1 * | 6/2004 | Allen et al. | 428/362 |
| 6,896,841 B2 * | 5/2005 | Velicki et al. | 264/510 |
| 7,695,662 B2 * | 4/2010 | Oyama | 264/258 |
| 2009/0072429 A1 * | 3/2009 | Ashton et al. | 264/152 |
| 2011/0308711 A1 * | 12/2011 | Coleman et al. | 156/189 |
| 2012/0084999 A1 * | 4/2012 | Davis et al. | 36/93 |
| 2013/0172135 A1 * | 7/2013 | Jeanneau | 473/561 |

\* cited by examiner

COMPOSITE STRUCTURE MANUFACTURING METHOD AND APPARATUS

CROSS-REFERENCE TO RELATED APPLICATIONS

This application is a continuation-in-part of U.S. Pat. No. 8,522,663, entitled, "MULTILAYERED BALLISTIC PROTECTION", issued on Sep. 3, 2013, which is herein incorporated by reference as if set forth herein in its entirety.

TECHNICAL FIELD

This application relates to composite materials and the manufacture of composite materials having one or more of several different desirable properties.

BACKGROUND

Computer numerical controlled (CNC) positioning systems have enabled significant changes in manufacturing technology over the last several decades. Initially CNC technology was used to provide tool positioning and spindle speed control for milling machines to enable a high degree of repeatability. Nearly every manufacturing process since has had CNC technology incorporated to some degree. Recently CNC technology has been adapted for use in emerging additive manufacturing technologies.

Recently, three-dimensional (3D) printing technology has emerged as a paradigm shift to traditional manufacturing. 3D printing is an additive technology in which objects are created through sequential layering, using inkjet-like nozzles to dispense the object material. Traditional manufacturing is subtractive, and involves cutting, etching, and removal of material. In both cases, a CNC-controlled tool is positioned to add or remove material to create a final product.

3D printing employs software to model the object to be produced, slice the model into digital cross-sections, and use the cross-sections as guides to print the object. The printing or lying down of material involves liquid, powder, or layers of sheets. Because of the precision and scale of the 3D printer, almost any shape can be manufactured using the technology.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

Figure 1:
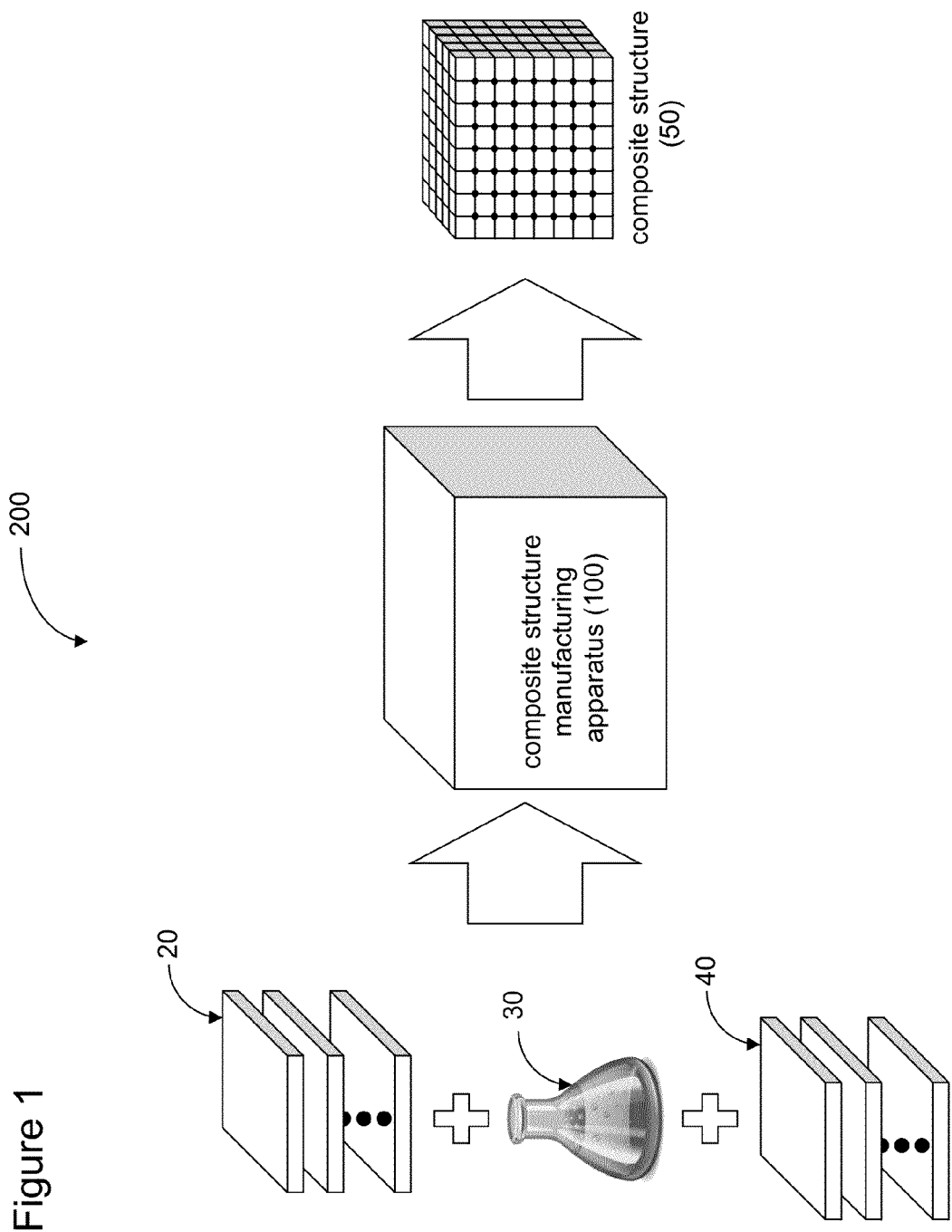
FIG. 1 is a simplified drawing of a manufacturing assembly using a composite structure manufacturing apparatus, according to some embodiments.

In accordance with the embodiments described herein, a novel manufacturing technology is disclosed herein that creates composite structures that exhibit predefined characteristics suitable for a number of different applications. The composite structures consist of flat sheathing that is formed into a bladder, a fabric covering, and one or more resin-based compounds that are created using the novel manufacturing technology. The novel manufacturing technology, in addition to employing three-dimensional printing technology, also applies principles of computer numerical controlled positioning, as well as additive and subtractive technologies, resulting in a new manufacturing process that can be used to create multilayered composite structures serving a variety of functions.

As part of the composite structure, the bladder is formed from multiple layers that are sealed to provide a gas barrier. In some embodiments, the bladder is located inside the fabric layers and can compress the fabric layers together when the bladder in inflated. The result is a three-dimensional shape with stronger than usual characteristics, due to the multiple layers of fabric that are bonded together.

In some embodiments, specific areas of the bladder are cut away to allow the impregnated fabric layers to make contact through the bladder. Such contact points can be cured locally to restrict the movement of the assembly when the bladder is inflated.

In some embodiments, bladders are mounted to the outside of the fabric assembly to further define a desired shape. For example, a thin object that covers a large curved surface can be forced into that shape by placing a bladder on the outside of the object or adjacent to the object, such that the bladder operates as a mold.

In some embodiments, the fabric layers are substantially impregnated with resin that cures the assembly into a rigid shape. In other embodiments, the fabrics are selectively impregnated to remain flexible once the rest of the fabric is cured. Using this selective impregnation, functions such as hinges, may become part of the composite structure.

The process of layering bladders fabrics can be repeated until the desired number of layers in achieved. Components that are printed using this process can be assembled using hand-held curing tools that locally rigidize and fuse components together.

Besides providing load-bearing capabilities by creating resin impregnated composite structures, additional materials can be applied to the bladder or fabrics layers to provide other functions, such as but not restricted to, transmission of power, data or thermal energy. Power collection, power transmission, and thermal energy rejection are also possible embedded functions of the composite material.

In some embodiments, components are placed inside the bladders or onto the fabric layers as the composite structure product is being created, to provide functions, such as but not restricted to, data storage, sensors, data transmission, power, and fastener locations.

The composite structure product produced by the novel manufacturing technology may assume any of a myriad of predefined shapes. The composite structures exhibit fire resistance, water resistance, water containment, phase-change capability, ballistic protection, low weight, and further may be operable as a solar panel or be electrically conductive, thermally conductive, thermally insulating, or provide a fluid barrier.

The composite structures are optionally constructed with vias or pathways, through which pipes, electrical conduit, and other building materials may be threaded. The residual volumes created by the act of inflation can be used to store materials or to facilitate movement within the structure. The novel manufacturing technology creates the composite structures by printing them, already impregnated and selectively cured. Following their manufacture, the composite structures are optionally inflated so as to take on an intended shape.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

FIG. 1 is a simplified block diagram of a manufacturing system or assembly 200, according to some embodiments. The manufacturing system or assembly 200 utilizes a composite structure manufacturing apparatus 100 to generate composite structures 50, both of which are described further below. Using 3D printing technology, computer numerical controlled (CNC) technology, and other additive and subtractive techniques, the composite structure manufacturing apparatus 100 receives sheathing 20, a resin-based compound 30, and fabric 40, to produce the composite structures 50.

The sheathing 20 that is received into the apparatus 100 consists substantially of plastic material, in some embodiments. The sheathing 20 is thus also known herein as plastic 20 or plastic sheathing 20. Plastics consist of any of a variety of synthetic organic materials that are moldable. Most commonly derived from petrochemicals, plastics may also include natural materials. Even in an initial state, the plastics 20 may include a variety of other organic and/or inorganic compounds.

Before describing the composite structure manufacturing apparatus 100 in detail, the composite structure 50 is characterized. The composite structure 50 is essentially an impregnated fabric bladder assembly. U.S. Pat. No. 8,522,663, entitled, "MULTILAYERED BALLISTIC PROTECTION", (hereinafter, "ballistic protection patent"), includes a description of a multilayered ballistic protection assembly, which forms the basis for the composite structure described herein.

In essence, the composite structure 50 consists of layers of plastic, which are melded to form a bladder. The bladder is cut into a predefined shape and surrounded with a fabric layer. The fabric layer is impregnated with a resin-based compound having any of a variety of desirable properties that are suited to the intended application. The impregnated fabric bladder assembly is cured and inflated, forming the composite structure 50.

The outer fabric layers of the impregnated bladder assembly help compress the bladder after inflation and during the curing process. At least three elements, bladder, fabric, and resin-based compounds, interact during the deployment and curing to create a high-strength composite structure, using no molds or tools. Using programmable bladder sealers and dynamic curing masks, the 3D printing and CNC technologies disclosed herein make possible the creation of virtually any shape that can be compressed into a flat pattern prior to inflation. In some embodiments, multiple objects may be assembled and welded/cured together to create structures that are preferably "printed" in segments.

By changing the shape and arrangement of bladder cells, the connections to the outer layers and the variable curing of the impregnated materials, the composite structure manufacturing apparatus 100 is capable of producing complete standalone structures or replacement parts of virtually and shape or size.

Several figures are used to describe the operations of the composite structure manufacturing apparatus 100. Plastic 20 or plastic sheathing 20 are referred to in several figures as plastic 20A, 20B-20J (collectively, "plastic 20", "plastics 20", or "plastic sheathing 20"). The plastics 20 and fabric 40 will be disposed on a flat surface of some sort: a build bed, a platform, a rotating table, a conveyor belt, and so on, upon which the plastic sheathing 20 or fabric 40 will sit.

Figure 2:
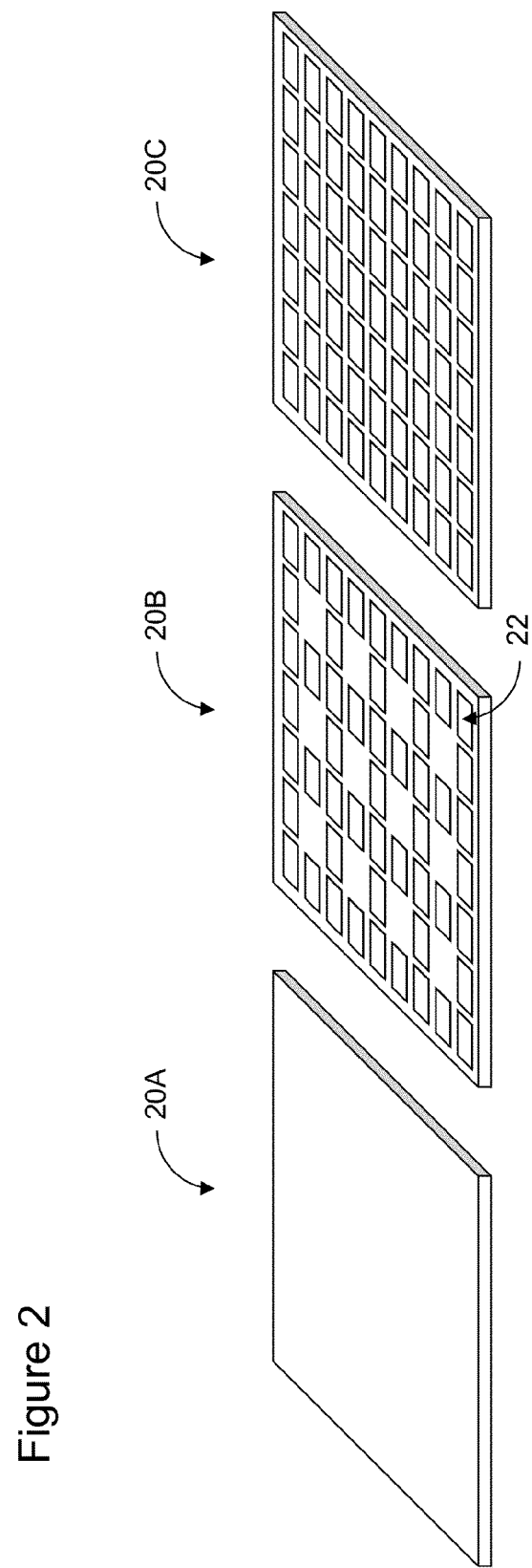
FIG. 2 is a diagram of three input sheathings used by the composite structure manufacturing apparatus of FIG. 1, according to some embodiments.

In some embodiments, the plastic sheathing 20 is perforated into units or elements 22. FIG. 2 shows plastic sheathing 20A, 20B, and 20C. The plastic sheathing 20A is a smooth contiguous sheet of plastic with no perforations and thus no individual units or elements 22. The plastic sheathing 20B has some perforations into plastic elements 22. The plastic sheathing 20C is uniformly perforated such that plastic elements 22 of identical size are evenly distributed through the sheathing. The size of the plastic elements 22 is, in some embodiments, equal to the smallest size of the dispensers used by the composite structure manufacturing apparatus 100.

In some embodiments, the compound 30 used to make the composite structure 50 is a resin combined with one or more additional materials. The resin may be any of a number of commercially available resins. Commonly, resins are liquids that form rigid cross-linked polymers when promoted and activated with a catalyst. As used herein, a resin is a thick liquid substance that hardens into a solid. The resin may be a thermoset, in which the resin sets and becomes solid. Or, the resin may be a thermoplastic, in which the resin sets and becomes solid, but can later be melted, then can be set again and hardened. Resins may be made from plant materials or may be synthetic materials made in a laboratory and can be of the thermoset resin variety as described or a thermoplastic resin.

In some embodiments, the compound 30 used to make the composite structure 50 is a resin, combined with another material, resulting in a resin compound that has a desired characteristic. The compound 30 may thus consist of resin combined with a fire retardant, so as to produce a fire-resistant composite structure 50. Or, the compound 30 may consist of resin combined with a phase-change material. The compound 30 is presumed to be a homogeneous mixture of the resin with the added material(s).

The third material received by apparatus 100 is a fabric material 40. In some embodiments, the fabric material 40 is impregnated with the compound 30 during manufacture of the composite structure 50. The fabric 40 thus provides some structural benefit, as well as containing the desired characteristic, such as flame retardant capability.

The composite structure 50 produced by the manufacturing apparatus 100 consists of a multi-cellular bladder, with a series of intracellular impregnated composites and outer constraining layers. In some embodiments, the multi-cellular bladder is heat-sealed in patterns that, when inflated, are capable of assuming almost any shape. The heat-sealed patterns are cut in specific areas so as to allow the surrounding impregnated fabrics to contact and be selectively cured to provide structural integrity across the cellular structures.

Figure 3:
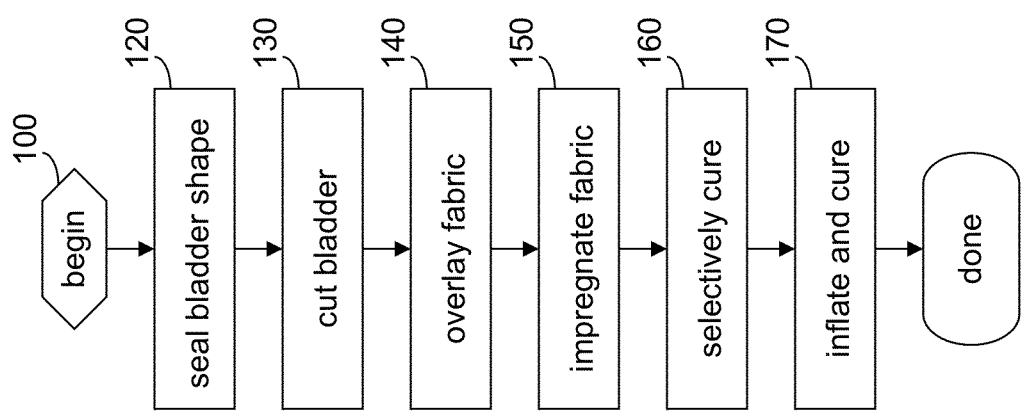
FIG. 3 is a flow diagram showing operations performed by the composite structure manufacturing apparatus of FIG. 1, according to some embodiments.

FIG. 3 is a simplified flow diagram showing the process steps performed by the composite structure manufacturing apparatus 100, according to some embodiments. Each of the functional steps performed by the apparatus 100 is described further below: seal bladder shape 120, cut bladder 130, overlay fabric 140, impregnate fabric 150, selectively cure 160, and inflate and cure 170. In one embodiment, these process steps occur in the order shown in FIG. 3. In a second embodiment, the process steps taken by the composite structure manufacturing apparatus 100 occur out of order relative to the flow diagram of FIG. 3.

Figure 4:
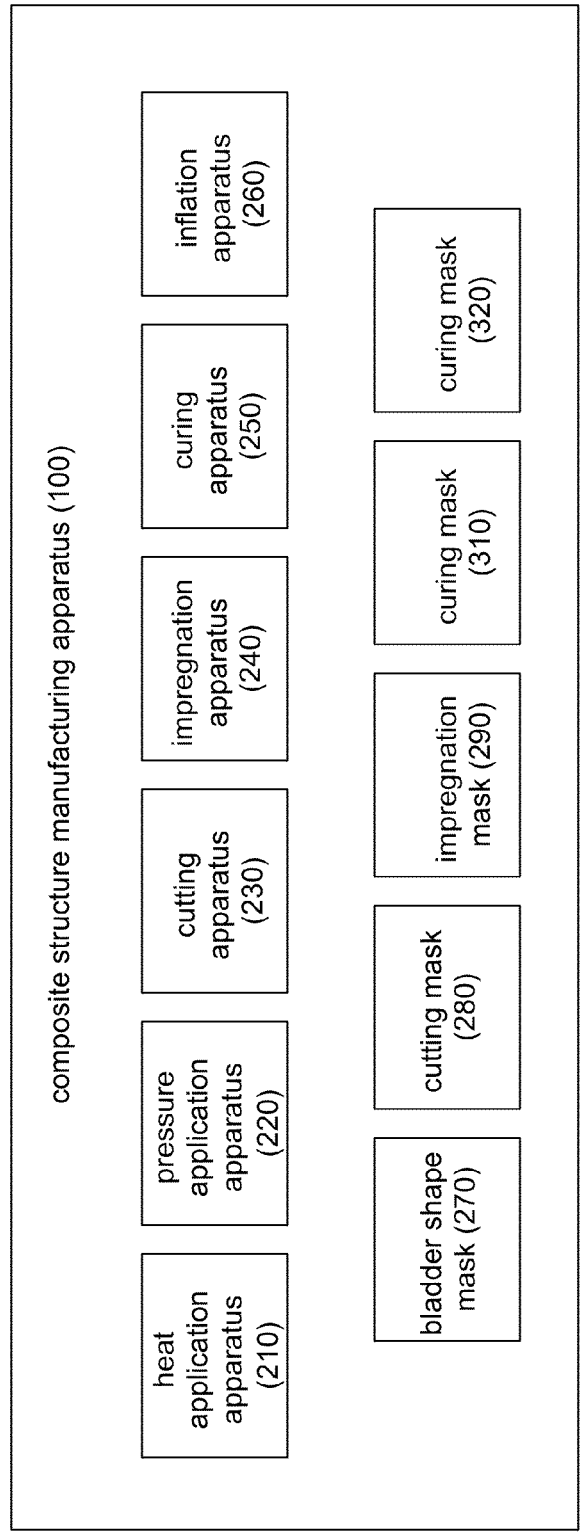
FIG. 4 is a diagram showing some components of the composite structure manufacturing apparatus, according to some embodiments.

FIG. 4 is a simplified block diagram showing some of the structural aspects of the composite structure manufacturing apparatus 100, according to some embodiments. The apparatus 100 includes a mechanism for providing heat application 210, pressure application 220, cutting 230, impregnation 240, curing 250, and inflation 260. In some embodiments, one or more of the mechanisms is combined. For example, the heat application 210 and pressure application 220 may take place using a single implement.

Further, the apparatus 100 employs a variety of masks 270, 280, 290, and 310, for specifying, with particularity, a location for performing each task. A bladder shape mask 270, for example, indicates a desired shape of the composite material 50. A cutting mask 280 indicates where to make cuts in the plastics 20. An impregnation mask 290 specifies where to deposit the compound 30 on the fabric 40. A curing mask 310 specifies what part of the interim product is to be cured. In some embodiments, the masks 270, 280, 290, and 310 are software-based. The process steps of FIG. 3 are described below, using the components of FIG. 4, in some embodiments.

The following paragraphs define the operations taking place by the composite structure manufacturing apparatus 100 in order to create a composite structure 50. As FIG. 1 illustrates, input sheathing 20, resin-based compounds 30, and fabrics 40 are combined in a novel and useful way to produce the composite structure 50. In all but the final stage, the composite structure 50 is incomplete. The term assembly or assembly 90 is used herein to describe the composite structure 50 in its various stages of existence prior to its completion.

Seal Bladder Shape

The composite structure 50 built using the manufacturing apparatus 100 assumes any of a myriad of different shapes, built for a variety of purposes, in some embodiments. The illustrations included herein feature simple composite structures 50, for ease of understanding. Designers of ordinary skill in the art will quickly discover the almost limitless arrangements of plastic sheathing 20, resin-based compound 30, and fabric 40 that may be possible using the manufacturing apparatus 100. The initial bladder shape will determine the ultimate shape of the composite structure 50.

Figure 5:
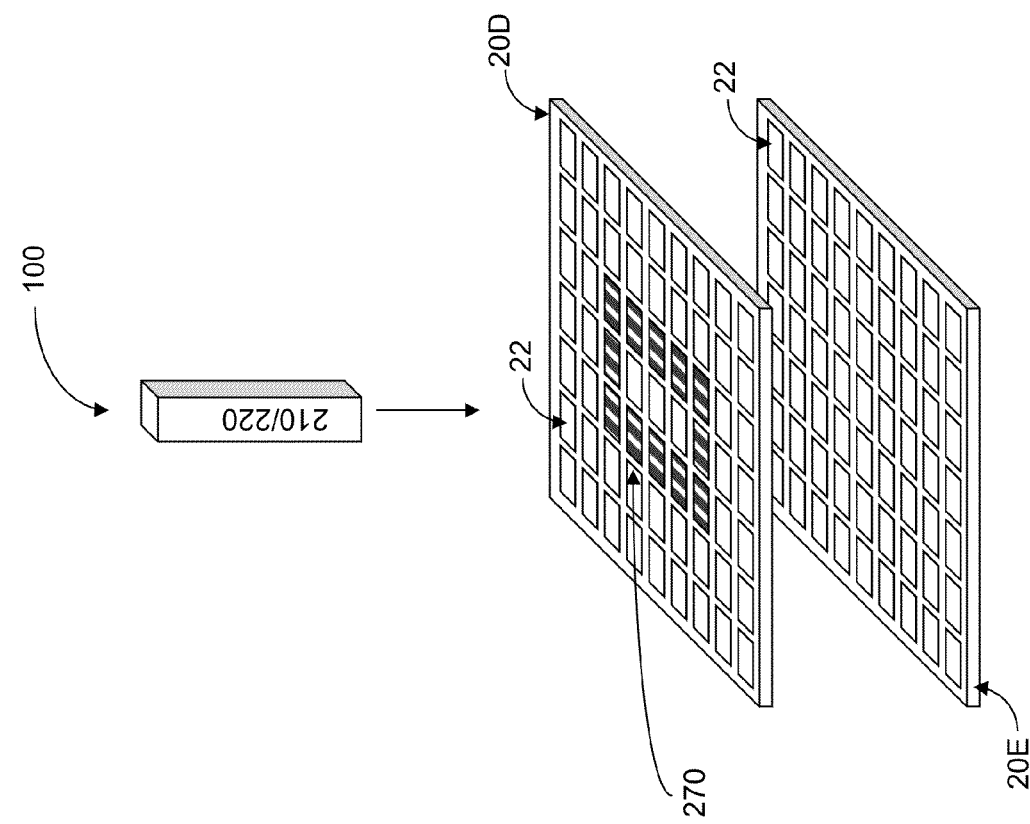
FIG. 5 is a diagram showing seal bladder shape operations performed by the composite structure manufacturing apparatus, according to some embodiments.

FIG. 5 is a simplified diagram showing seal bladder shape operations 120 performed by the composite structure manufacturing apparatus 100, according to some embodiments. The illustration features two sheaths of plastic 20D and 20E (collectively, "plastic 20" or "plastic sheathing 20") arranged atop one another as if stacking a small deck of cards. The plastic sheathing 20 include equally sized units or elements 22 arranged approximately equidistant to one another all along the plastic 20. The top sheathing 20A includes a bladder shape mask 270. To form a bladder, the two sheaths of plastic 20D and 20E are to be melded together at elements 22 in which the bladder shape mask 270 is present. In some embodiments, the plastic 20D is melded to the plastic 20E using heat application 210 and pressure application 220. In other embodiments, the melding is done using radio frequency (RF). In still other embodiments, the melding is done using chemical deposition.

Heat application means 210 and pressure application means 220 are illustrated schematically in FIG. 5 as a structure 210/220, such as a mechanical arm, that is capable of moving down over the mask 270, so as to apply both heat and pressure to the desired mask element 22. The mechanical arm may move only in a vertical direction, only in a horizontal direction, in both vertical and horizontal directions, or may be stationary, with the underlying assembly (including the plastic sheaths 20D and 20E) instead moving.

The actual mechanism by which the heat and pressure are applied may vary. In some embodiments, the manufacturing apparatus 100 includes a mechanical arm having a heating element at its distal end, where the mechanical arm is capable of applying pressure to the plastic for a defined time period. The defined time period depends on the temperature of the distal end of the mechanical arm, the thickness, melting point, and other characteristics of the plastics 20, and other considerations. Selective laser melting is another technique that may be used to melt or soften the input sheathing 20 together.

In one embodiment, the plastic sheaths 20 sit in place while the mechanical arm moves over and applies heat and pressure to the masked elements 22. In a second embodiment, the plastic sheaths 20 move according to a software mask such that the masked elements 22 are disposed beneath a horizontally stationary mechanical arm as the arm periodically applies heat and pressure by moving vertically down upon the element. In a third embodiment, the apparatus 100 includes multiple mechanical arms having heat and pressure capability such that multiple masked elements 22 simultaneously receive the heat and pressure.

Figure 6:
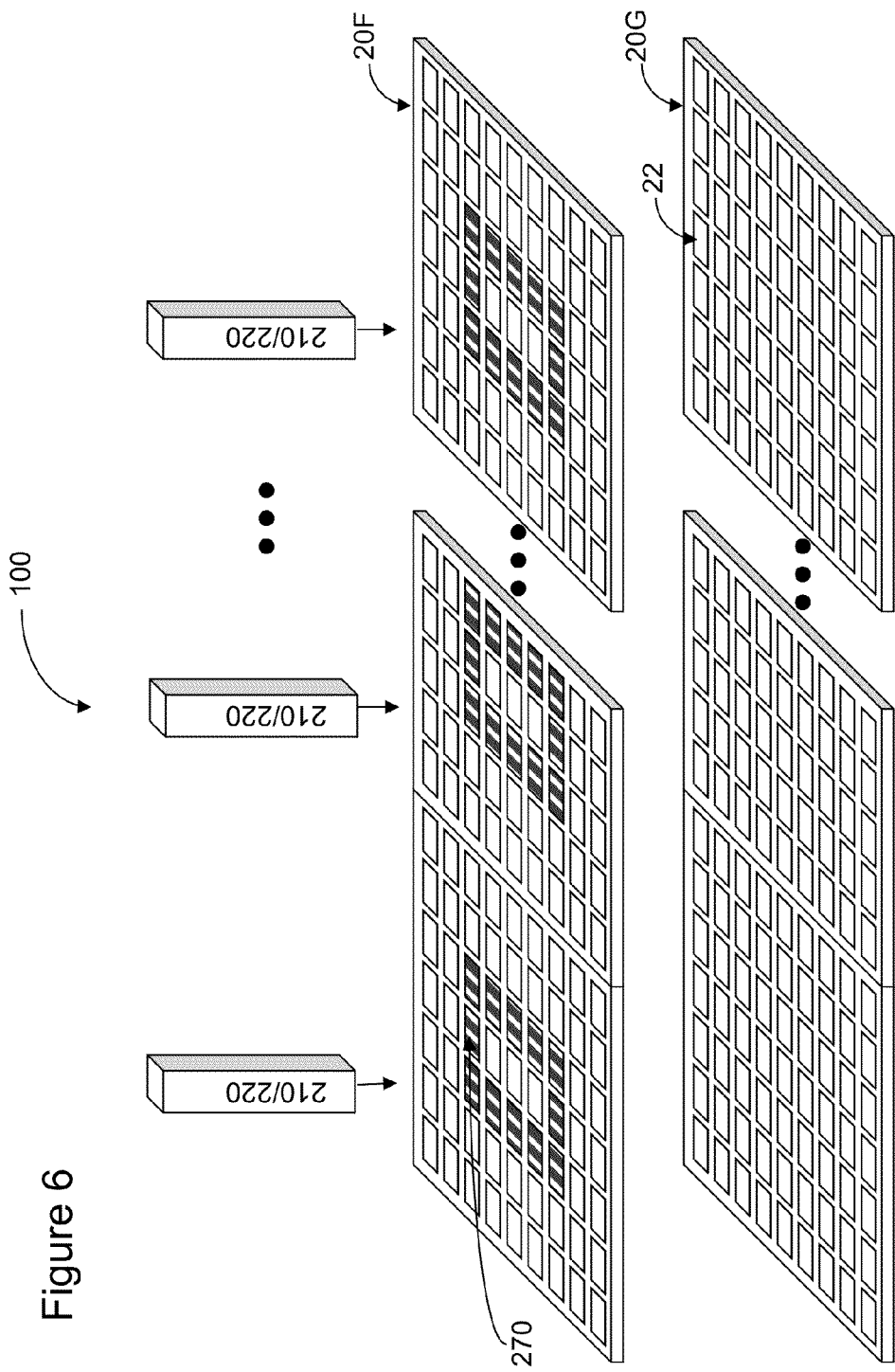
FIG. 6 is a second diagram showing seal bladder shape operations performed by the composite structure manufacturing apparatus, according to some embodiments.

FIG. 6 is a second simplified diagram showing seal bladder shape operations 120 performed by the composite structure manufacturing apparatus 100, according to some embodiments. Three or more mechanical arms for applying both heat 210 and pressure 220 over three elements 22 of the mask 270 simultaneously. Two sheets of plastic 20F and 20G are visible, although the composite structure 50 may be made up of multiple layers of plastic. In some embodiments, the bladder shape mask 270 is visible only on the top surface of the plastic 20F.

Cut Bladder

Once the plastic sheaths 20 are melded together using the mask as a guide, cuts are made to the melded sheaths, in some embodiments. The melded sheaths will eventually form a bladder that is the composite structure 50. Cutting the bladder allows contact between layers on either side of the bladder. The cutting may be using a knife, a laser, or other cutting device.

Figure 7:
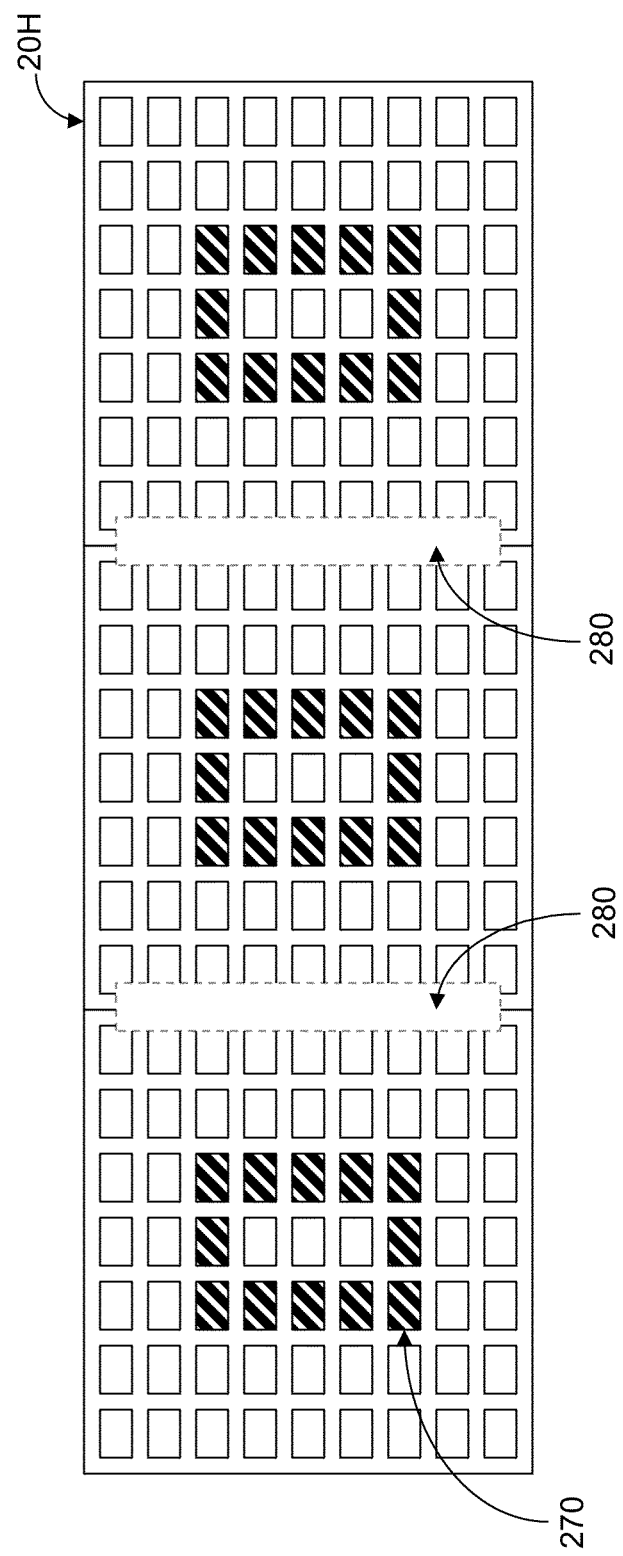
FIG. 7 is an overhead view of the input sheathing, showing both bladder shape masks and cutting masks, used by the composite structure manufacturing process, according to some embodiments.

FIG. 7 is an aerial shot of plastic sheath 20H, similar to the plastic sheath 20F of FIG. 6, this time showing cutting masks 280 in addition to the bladder shape masks 270. The cutting masks 280 indicate where the plastic is to be cut.

As with the heating/pressure operation, the cutting operation may be achieved in a number of different ways. In one embodiment, the plastic 20 is stationary while a mechanical arm having cutting means 230 is positioned over the cutting mask 280 to cut the plastic 20. Since the plastic consists of at least two layers of plastic, part of which are melded together, the cutting means 230 is capable of cutting through all present layers, in some embodiments.

Figure 8:
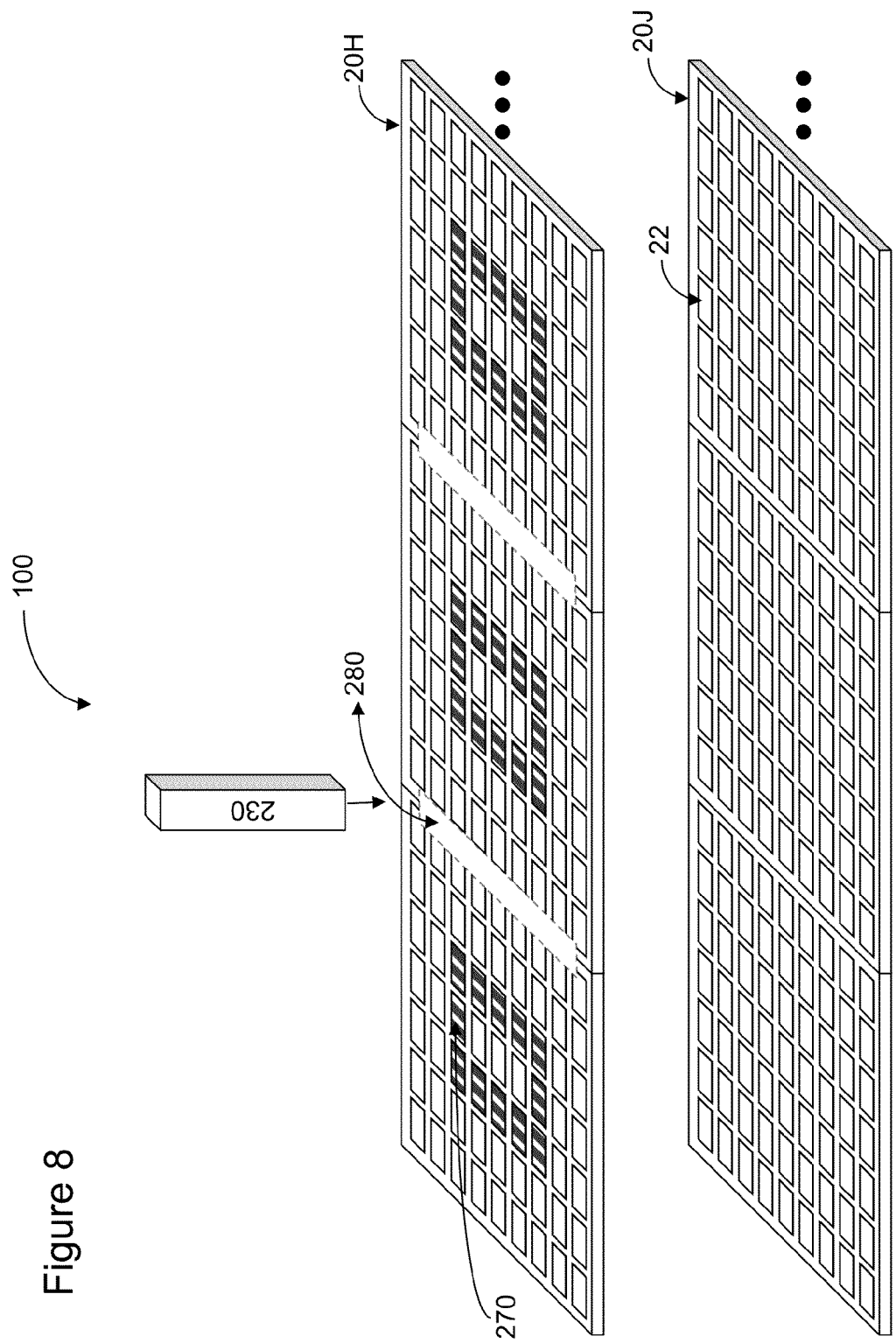
FIG. 8 is an illustration of cutting means used by the composite structure manufacturing apparatus, according to some embodiments.

FIG. 8 is a diagram showing cutting means used by the composite structure manufacturing apparatus 100, according to some embodiments. The illustration shows plastic sheaths 20H and 20J, along with cutting means 230, according to some embodiments. Since it is disposed directly beneath the plastic sheath 20H, which shows cutting masks 280, the plastic sheath 20J has no masks, in some embodiments. The cutting mask 280 is a guide to the cutting means 230, enabling cuts to be made mechanically.

In another embodiment, the cutting means 230 is stationary while the plastic sheaths 20 move underneath during cutting operations. The plastic sheaths 20 sit atop a table that moves according to the cutting mask 280. In still another embodiment, the manufacturing apparatus 100 includes multiple cutting means 230 that are able to operate either simultaneously or independent of one another. In another embodiment, the bladder shape mask 270 and the cutting mask are software-based, with no indicators being visible on the plastic sheaths 20.

The above operations, sealing the bladder shape and cutting the bladder, depending upon the desired shape of the composite structure 50, may be performed in reverse order. Further, some composite structures 50 will require a melding operation followed by a cutting operation, followed by a second melding operation, a second cutting operation, and so on. For multilayered applications in which the composite structure 50 is somewhat uniform in each layer, it may be possible to meld and cut more than two layers of plastic sheathing 20 during each operation. Where the composite structure 50 is heterogeneous in its shape, layers may be separately configured and then combined in a final melding step.

Overlay Fabric

Recall from FIG. 1 that the composite structure 50 is generated using plastic sheathing 20, a resin-based compound 30, and fabric 40. In some embodiments, fabric 40 is rolled from a spool onto the assembly. The fabric 40 is the means by which the resin-based compound 30 becomes part of the composite structure 50, and thus the fabric takes on the desired one or more characteristics provided by the resin-based compound.

Thus, the shape of the fabric 40 at this stage is dependent upon the shape of the underlying plastics 20. The fabric 40 is thus overlaid upon the two or more sheaths of plastic 20, which may have already been melded and cut. The fabric 40 may have a different number of yarns, weaving patterns, and orientations. There are also "mats" of fabric that are not woven, but are bonded together with a resin-soluble material. The number of fabric layers and the material of the fabric are dependent upon the application of the composite material 50 being made using the manufacturing process 100. The fabric 40 is not attached to the underlying plastics 20 because the fabric is to be impregnated with a resin-based compound 30 in the next step that will permanently attach the fabric to the plastics.

Impregnate Fabric

In this step, the overlaid fabric 40 is impregnated with the resin-based compound 30, in some embodiments. The resin-based compound 30 may be premixed or may be mixed in the apparatus 100 prior to deposition on the fabric 40. Some likely resin-based compounds used by the apparatus 100 are described in more details, below.

Figure 9:
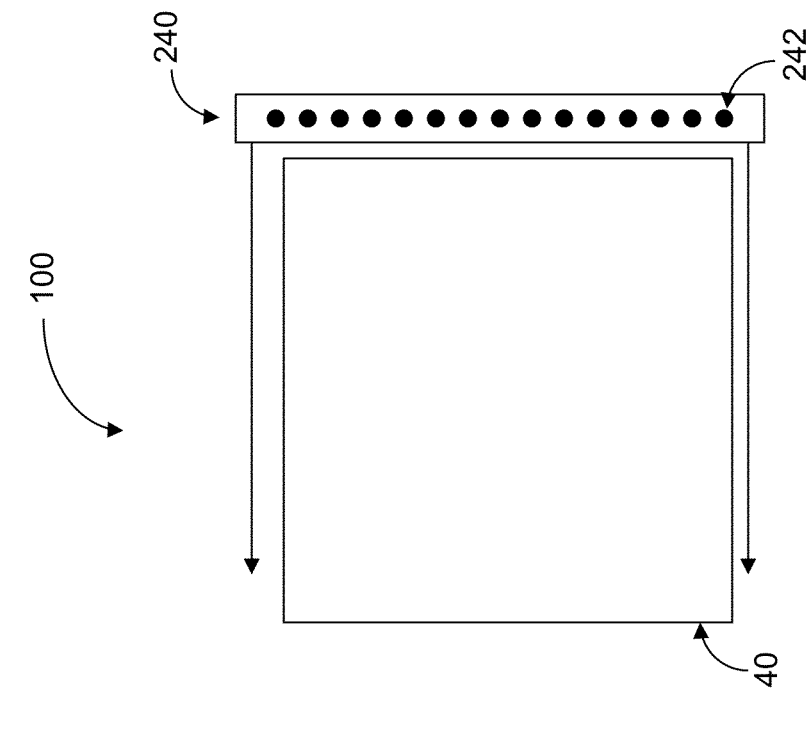
FIG. 9 is a simplified diagram of the impregnation apparatus of the composite structure manufacturing apparatus, according to some embodiments.

As with the other processes described so far, there are many ways in which the fabric 40 can be impregnated with the resin-based compound 30. FIG. 9 is a simplified diagram of an impregnation apparatus 240 used by the composite structure manufacturing apparatus 100, according to some embodiments. The illustration shows the apparatus 100 having a portion of fabric 40 sitting on the assembly, with an impregnation means 240 for depositing the resin-based compound 30 in the fabric. The impregnation means 240 may be a structure holding multiple dispensers 242 for depositing the resin-based compound 30 upon the fabric 40. The impregnation means 240 resembles an inkjet printer that selectively deposits ink onto a piece of paper. With the multiple dispensers 242, the impregnation means 240 enables the entire portion of fabric 40 to be saturated with the compound 30 in a relatively short time period.

In some embodiments, the impregnation means 240 is controlled by software so as to selectively deposit the resin-based compound 30 upon the fabric 40. The compound 30 may seep into the fabric 40 in a few seconds), or may take longer to saturate the fabric, depending on the fabric used, the type of compound, and how much of the fabric is being impregnated. In one embodiment, the entire fabric 40 is saturated with the resin-based compound 30. In another embodiment, only selected portions of the fabric 40 are saturated with the compound 30.

Figure 10:
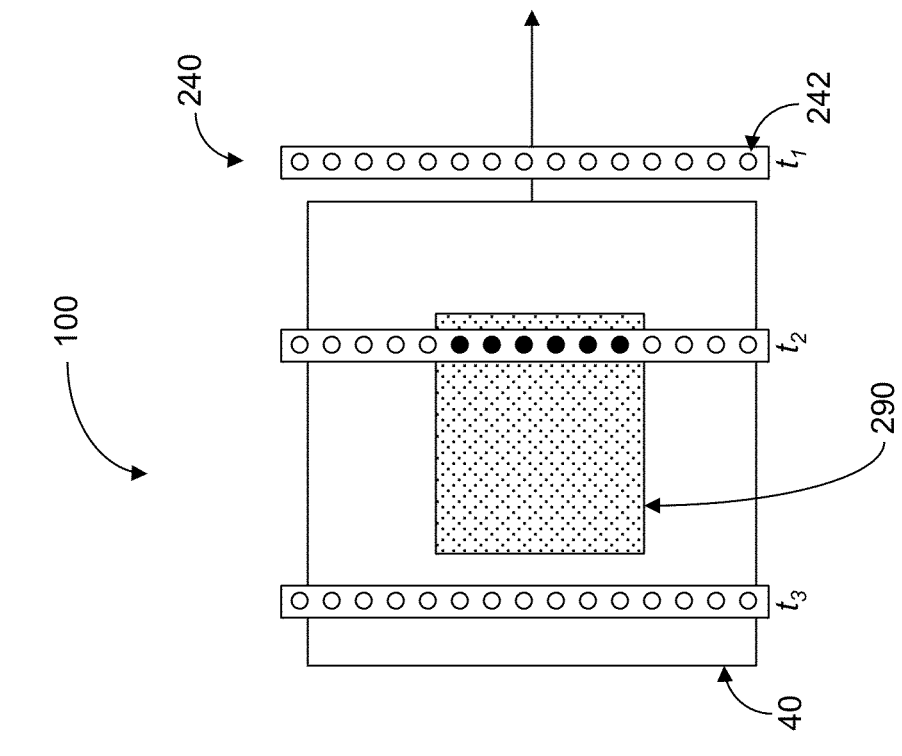
FIG. 10 is a second diagram of the impregnation apparatus with an impregnation mask of the composite structure manufacturing apparatus, according to some embodiments.

FIG. 10 is another simplified diagram of the impregnation apparatus 240 of the composite structure manufacturing apparatus 100, according to some embodiments. In the illustration, a square-shaped impregnation mask 290 indicates to the impregnation means 240 that only the center of the fabric 40 is to be impregnated with the resin-based compound 30. The dispensers 242 are modified to indicate which are to be turned on, with the all black dispensers indicating "on" and the white dispensers indicating "off". At a time, $t_1$, before the fabric 40 is beneath the impregnation means 240, all dispensers 242 are turned off. At a second time, $T_2$, only the dispensers 242 that are directly over the mask 290 are turned on. At a third time, $T_3$, the impregnation means 240 is no longer disposed over the mask, and therefore all the dispensers 242 are turned off.

Selectively Cure

In this stage of the composite structure manufacturing process 100, the impregnated fabric is selectively cured so as to harden the resin-based compound 30. In some embodiments, the resin-based compound 30 includes a catalyst and a promoter. Upon exposure to ultraviolet (UV) radiation, the catalyst is triggered, then works with the promoter to initiate a chemical reaction, which causes the molecules of the resin to cross-link and polymerize, thus forming a much harder substance than in its initial state. Once hardened, the resin-based compound remains rigidized and does not thereafter return to an initial state.

At this stage of the composite structure manufacturing process 100, the impregnated fabric 40 of the assembly so far is selectively exposed to UV light. In one embodiment, the whole sheath of fabric 40 is exposed to UV light, thus hardening its entirety. In a second embodiment, only part of the sheath of fabric 40 is exposed to the UV light. A curing mask 310 is thus used for this stage of the process.

Figure 11:
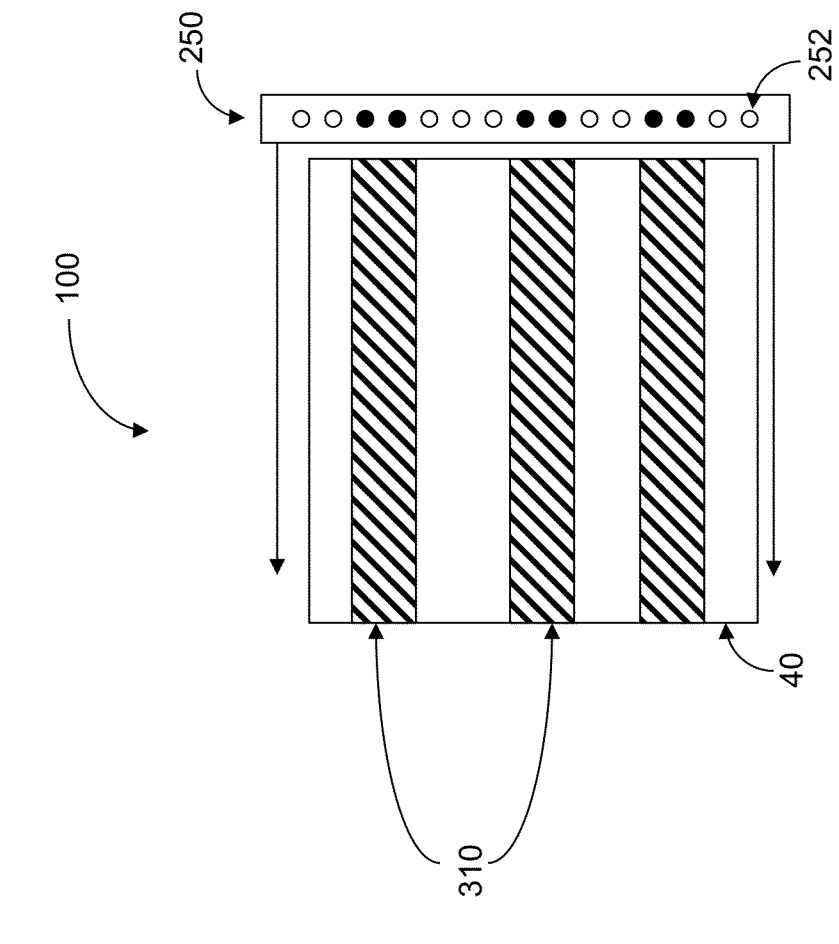
FIG. 11 is a diagram of the curing apparatus used by the composite structure manufacturing apparatus, according to some embodiments.

FIG. 11 is a simplified diagram of the selective curing process 160 used by the composite structure manufacturing apparatus 100, according to some embodiments. The drawing shows a fabric sheath 40 adjacent to a curing apparatus 250 having a series of curing dispensers 252. The fabric sheath 40 is covered in a curing mask 310 having three portions (diagonal striped). The curing dispensers 252 are color-coded to indicate whether on or active (black) or off or inactive (white). In this step, the curing dispensers 252 dispense ultraviolet light, the means by which the resin-based compound 30 impregnated into the fabric 40 is cured or hardened.

For other more limited curing masks 310, such as one similar to the impregnation mask 290 of FIG. 10, the curing dispensers 252 are selectively turned on and off at different points of the curing process.

As with the other processes described so far, the selective curing process 160 may be achieved in a number of different ways. In FIG. 11, the selective curing means 250 is a series of dispensers 252 for allowing UV light to selectively be applied over the fabric 40. In one embodiment, the curing means 250 is stationary while the fabric assembly moves beneath the dispensers 252, such as on a conveyor belt. The UV light source of the curing means 250 thus illuminates specific spots on the fabric assembly. In a second embodiment, the curing means 250 moves slowly over the fabric 40, while the fabric remains stationary. In a third embodiment, the curing means 250 consists, not merely of a row of dispensers, but of a series of dispensers 252 that may be selectively turned on and off.

Figure 12:
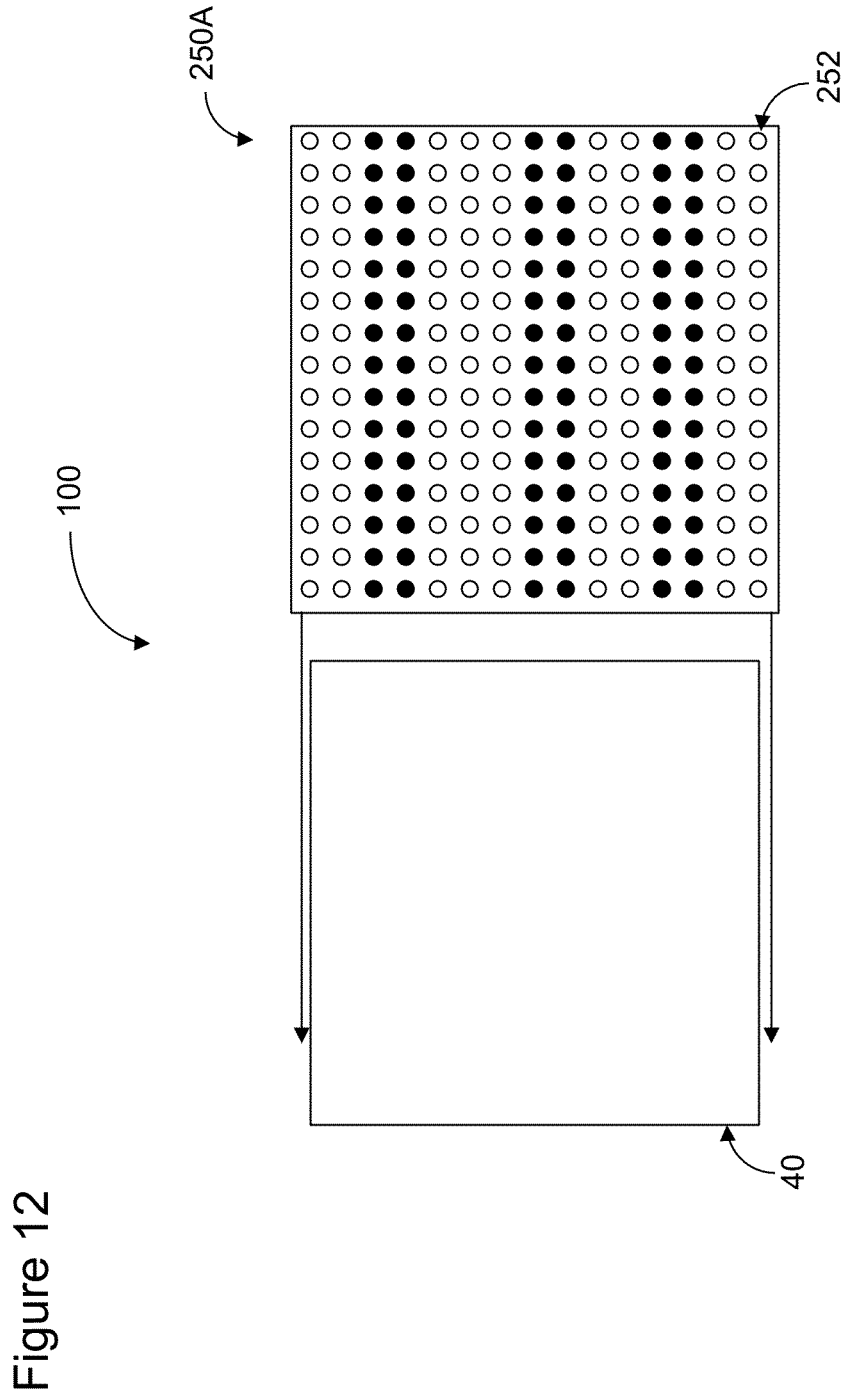
FIG. 12 is a diagram of a second curing apparatus used the composite structure manufacturing apparatus, according to some embodiments.

In FIG. 12, curing means 250A consists of a matrix of dispensers 252 that are controlled by software (not shown). In such a configuration, no curing mask 310 is necessary, as the software automatically indicates which dispensers 252 are to be enabled. In FIG. 12, the curing pattern replicates what the curing mask 310 in FIG. 11 achieves. However, it is possible to imagine that selective curing is limited only by the density of dispensers 252 (specifically, the amount of UV light emitted by the dispensers) in the curing means 250. By turning the dispensers 252 on and off in patterns, specific areas of the impregnated fabric 40 can be cured. It is also possible to have a single light source be moved over the assembly to specifically target spots to cure.

In some embodiments, following the selective curing step above, the composite structure 50 is complete and ready for the consumer. This is the case with the ballistic protection patent, in which the composite structure is available to the consumer in a folded or rolled up configuration. The consumer later unfurls the composite structure, inflates it, and exposes it to UV radiation. Once cured, the composite structure may be used for protection, such as window protection in advance of a severe weather event, or may be used for any of a number of different purposes. One of the benefits of the ballistic protection composite structure is its lightweight and ease of transport. Even though this consumer product envisions the UV exposure taking place after purchase, the selective curing step 160 described above is still performed, in some embodiments, such as to seam the edges of the composite structure 50. The selective curing operation 160 may thus be thought of as a sewing operation to secure some portion of the various layers making up the assembly.

Inflate and Cure

For the ballistic protection patent, the inflate and cure operation 170 of the composite structure manufacturing apparatus 100 may not take place, again so as to maintain a lightweight product suitable for consumer use. Other applications of the composite structure 50, however, utilize the inflate and cure operation 170, in some embodiments.

Figure 13:
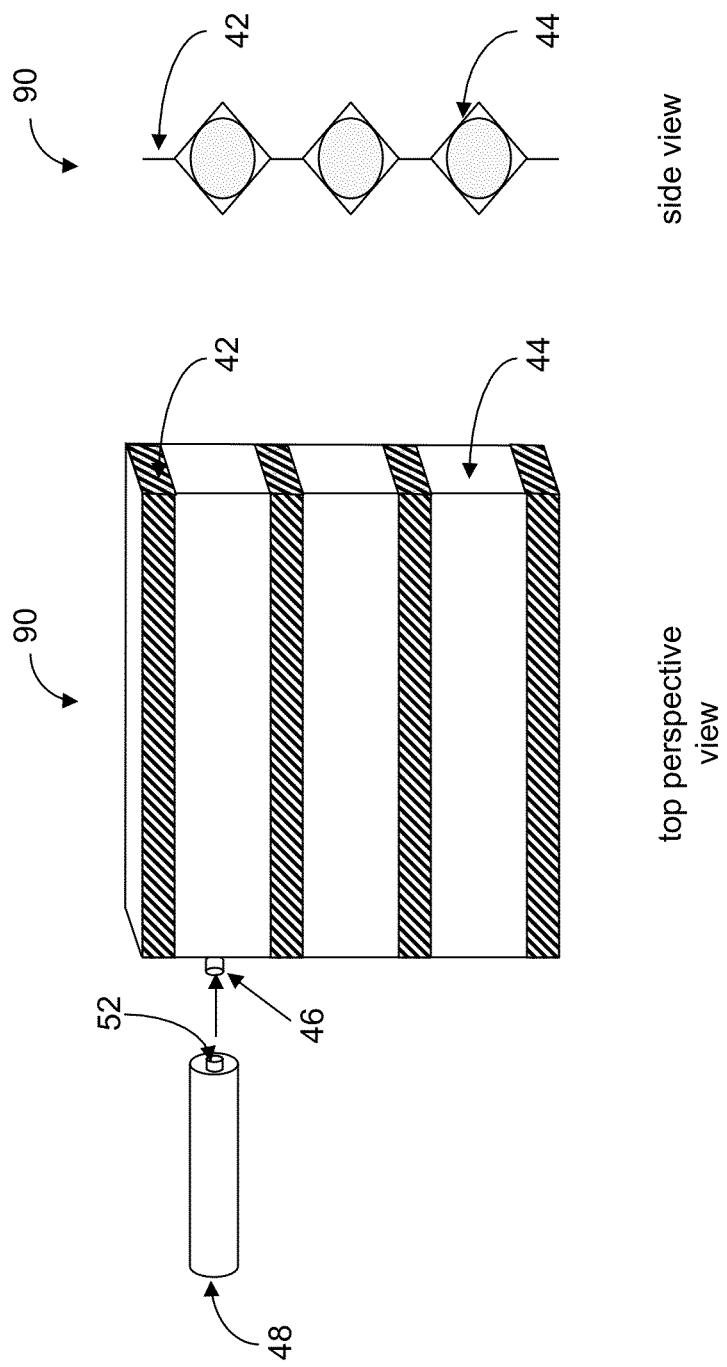
FIG. 13 is a top perspective and side view of the inflation apparatus of the composite structure manufacturing apparatus, according to some embodiments.

Top perspective and side views of the apparatus are depicted in FIG. 13, according to some embodiments. The views show additional selective curing 42 (diagonal stripes) and inflation locations 44 of the assembly 90. The additional curing locations 42 are cured in much the same manner as in the selective curing step, above, although a different curing mask 320 from the curing mask 310 is likely used, since the additional curing takes place on the impregnated fabric in locations where curing has not previously occurred. The additional curing flattens the assembly 90, as shown in the side view, at the curing locations 42.

The inflation locations 44 are where the assembly 90 is inflated. In some embodiments, the inflation means 260 is simply an air-dispensing hose 48 with an opening 52 that couples to an opening 46 of the assembly 90. Other gases besides air may be used. Once attached to the assembly 90, the hose 48 dispenses air into the assembly, causing the inflation locations 44 to fill up and expand in size. The additional inflation expands the assembly 90, as shown in the side view, at the inflation locations 44.

In some embodiments, a variety of different materials are used for the three component parts of the composite structure 100, enabling the structure to assume virtually any multicellular shape. In some embodiments, the resin and/or fabrics are augmented using one or more additives, depending on the characteristic desired for the composite structure 100. For example, phase change materials, fire retardants, shear thickening fluids, and so on, may be added to the resin-based compound 30 and impregnated into the fabrics 40 of the composite structure 100.

Figure 14:
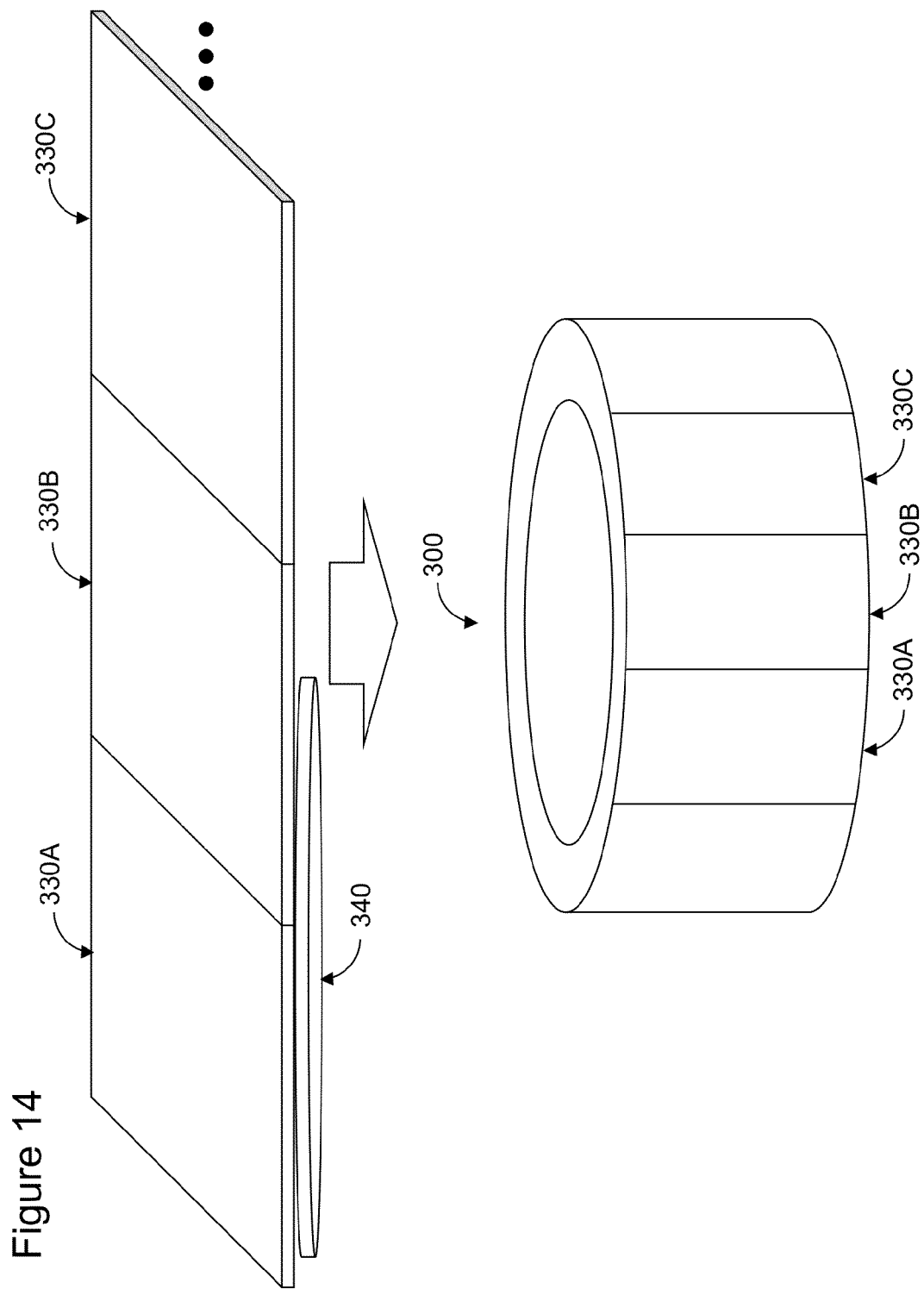
FIG. 14 is a simplified diagram showing multiple composite structures arranged to form a containment vessel, according to some embodiments.

Further, in some embodiments, the inflated bladders of the composite structure 100 may be utilized, following the curing process, to store fluid or other substances therein. The composite structure 100 may thus be arranged into a cylindrical shape and used for fluid tanks, as one example. FIG. 14 is a simplified drawing showing multiple rectangular-shaped composite structures 330A, 330B, 330C, . . . as well as cylindrical-shaped composite structure 340 being combined together to form a fluid tank 300 suitable for storing fluids.

The size of the composite structure 50 is not limited by the volume of the 3D printing technology, but is merely limited by the width of the manufacturing apparatus 100. In some embodiments, the composite structure manufacturing apparatus 100 supports composite structures 50 of up to twenty feet in width or larger, with the length being unrestricted. By combining structures of this size in sections, the composite structure manufacturing apparatus 100 enables the production of buildings, vehicle parts, turbine blades, boat hulls, and other high-strength, lightweight composite structures currently not possible using other additive manufacturing methods. Thus, this technology represents a new class of digital manufacturing that currently does not exist.

Figure 15:
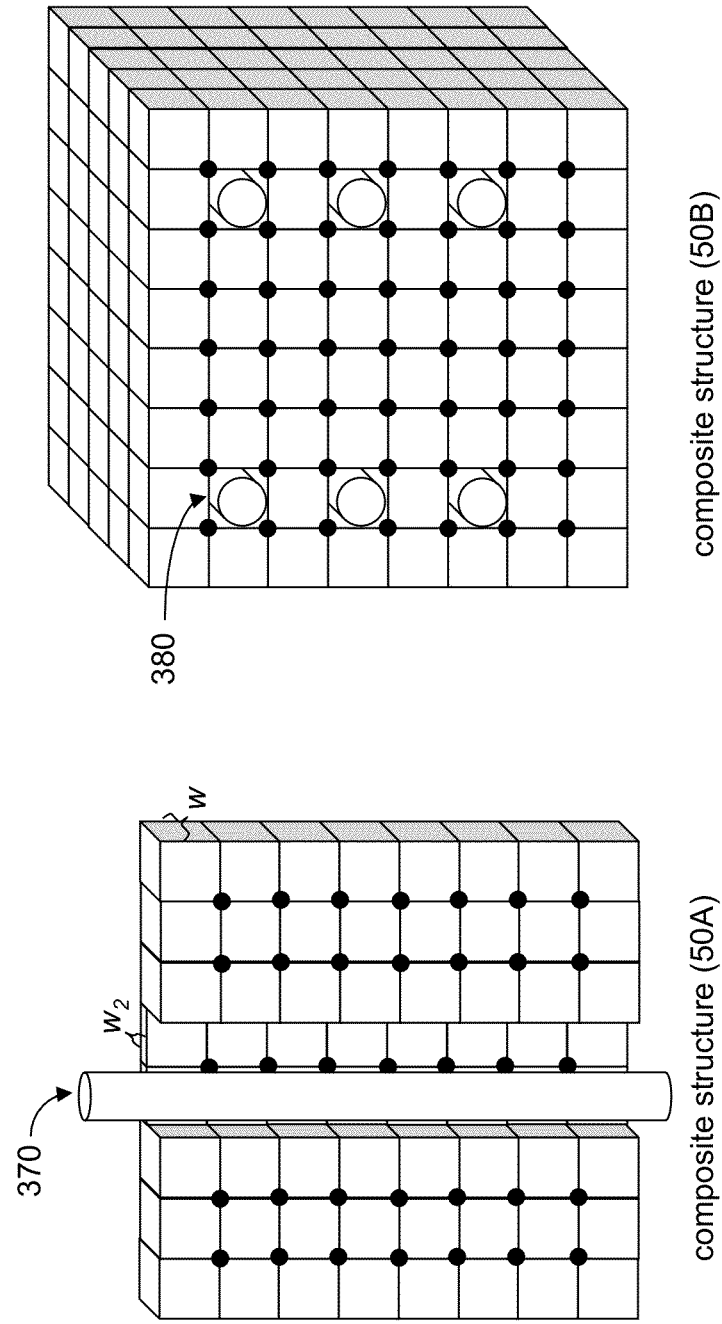
FIG. 15 is a simplified diagram showing two composite structures with pathways for conduits, created by the composite structure manufacturing apparatus of FIG. 1, according to some embodiments.

FIG. 15 is a simplified diagram showing two composite structures 50A and 50B produced by the composite structure manufacturing apparatus 100 of FIG. 1, according to some embodiments. The first composite structure 50A is formed of two pieces of plastic sheathing formed so that the end portions of the composite structure have a first width, w, while the center portion of the composite structure has a second width, $w_2$, where $w_2<w$. A tube 370 may readily be disposed in this narrower portion of the composite structure. The tube 370 may then be used to thread electrical wire, computer or television cables, and other wiring devices. Further, the tube 370 may be used as a pathway or via for water.

The second composite structure 50B is formed using six plastic sheaths melded together, with each layer being equidistant in size. By selectively cutting, impregnating, and curing the composite structure, pathways 380 may be formed during manufacture, such that electrical and other wires may be threaded, without the use of the external tube 370. In some embodiments, the pathway is formed by creating a bladder in a desired position where the pathway 380 is to be located. The composite structure may thus be designed to create these pathways during the manufacture, as in the composite structure 50B or may be designed to facilitate the addition of tubes 370, providing additional capability and functionality to the composite structure.

Figure 16:
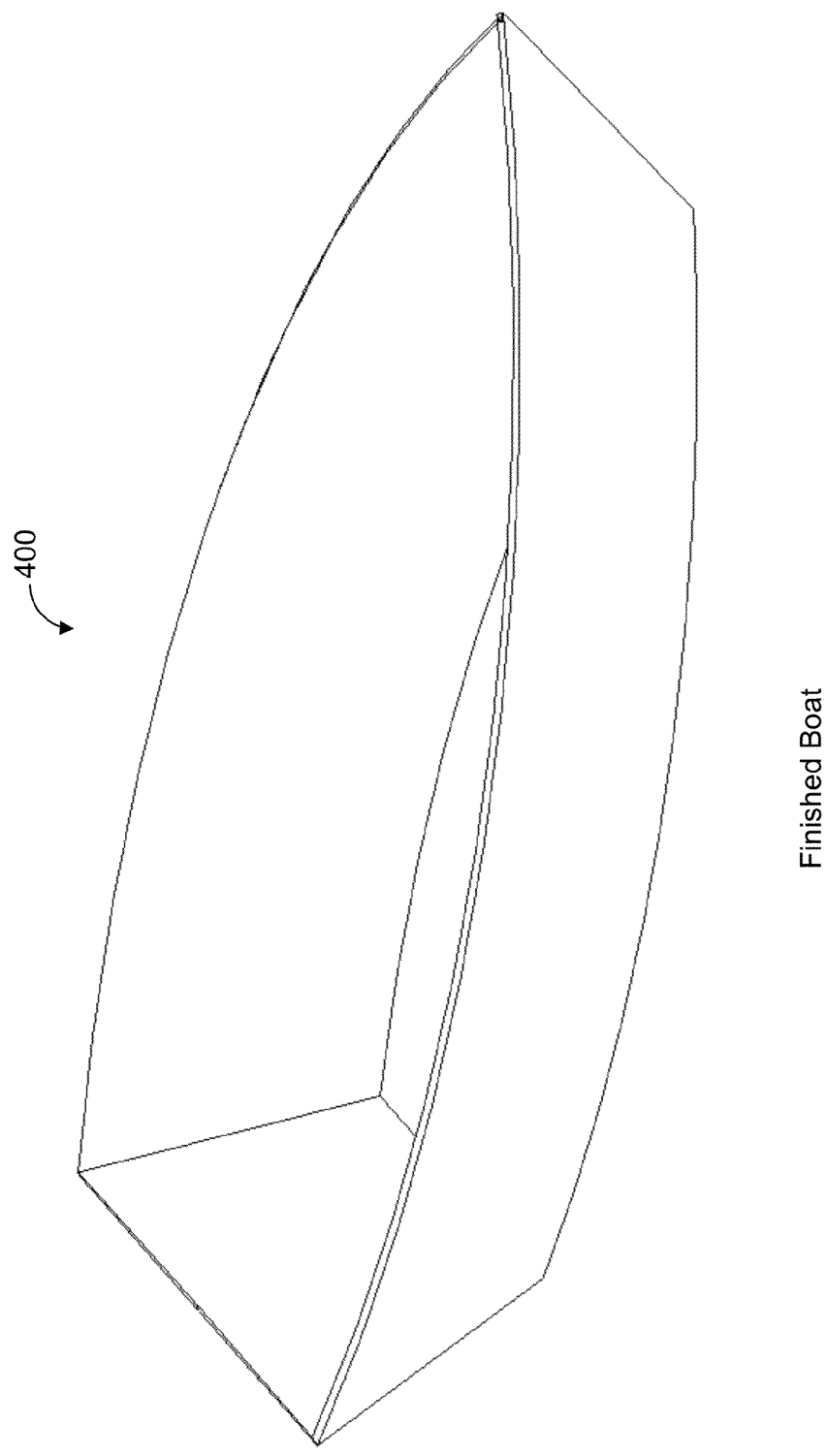
FIGS. 16 and 17 are diagrams showing a composite structure forming a boat made using the composite structure manufacturing apparatus of FIG. 1, according to some embodiments.
Figure 17:
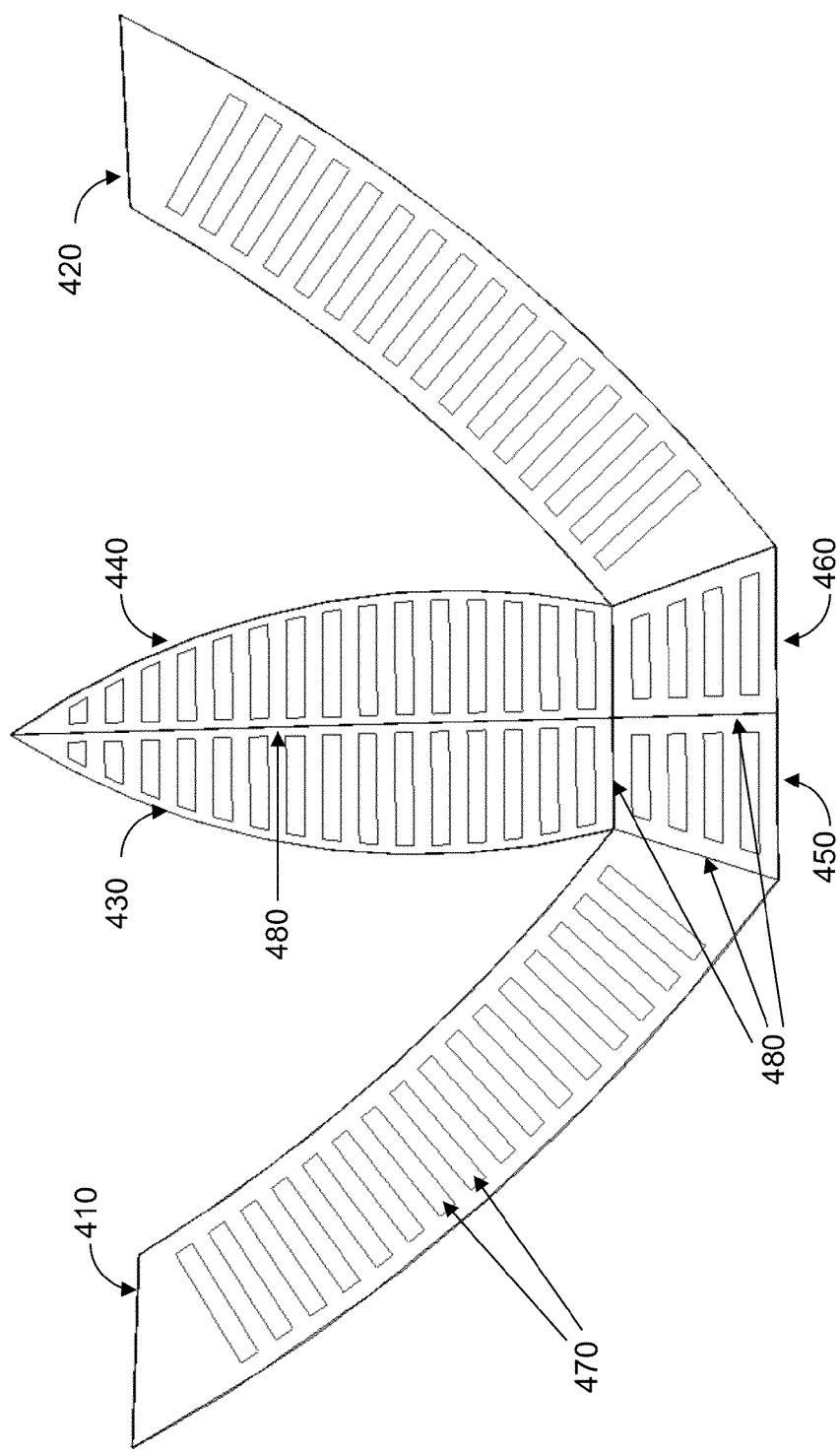

FIGS. 16 and 17 are simplified diagrams showing how a composite structure 50 may be created to manufacture a boat 400, according to some embodiments. FIG. 17 shows the six portions of the boat 400: the floor 430, 440, the sides 410, 420, and the back 450, 460. Each portion is separately made up of two or more layers of plastic sheathing, sealing multiple bladders 470, as described above, to give the sheathing structure. Before joining the separate structures 410-460, the resulting individual structures are then covered in fabric, impregnated with one or more resin-based compounds, and selectively cured to rigidize the structures. The structures 410-460 are then heat- and pressure cured, as if sewing the separate pieces together, to form seams 480. Once the six pieces 410-460 of the boat are seamed together, the final boat 400 can be inflated and cured into its final configuration (FIG. 16).

Figure 18:
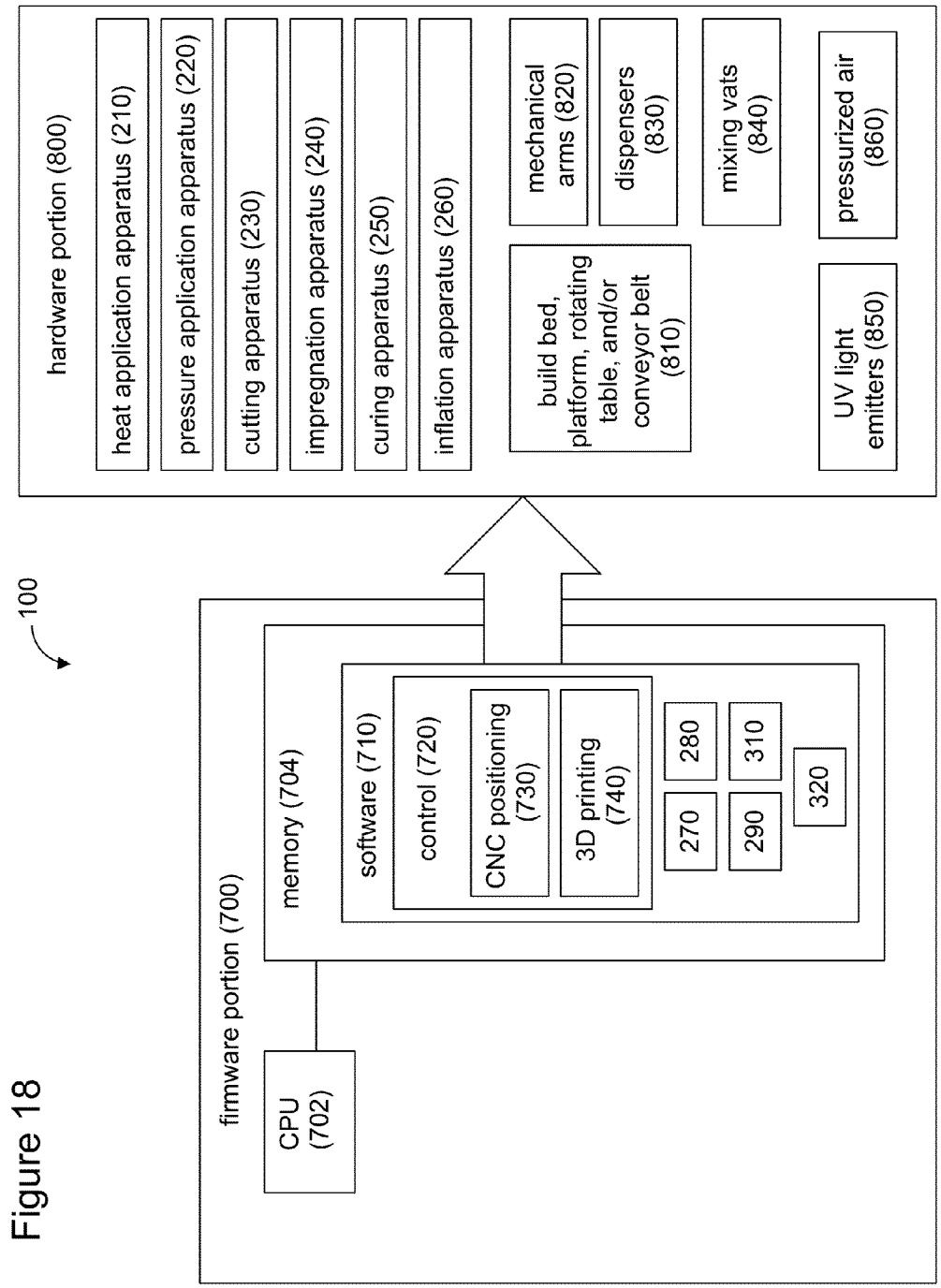
FIG. 18 is a simplified block diagram of software and hardware portions of the composite structure manufacturing apparatus of FIG. 1, according to some embodiments.

FIG. 18 is a simplified block diagram showing one possible arrangement of hardware and firmware in the composite structure manufacturing apparatus 100 of FIG. 1, according to some embodiments. The composite structure manufacturing apparatus 100 includes a firmware portion 700 and a hardware portion 800. The firmware portion 700 consists of some sort of processor-based system including a central processing unit (CPU) 702 coupled to a memory 704. When software 710 is loaded into the memory 704, the software is executed by the CPU 702 according to well-known principles.

The hardware portion 800 consists of the apparatus already described above, including the heat application apparatus 210, the pressure application apparatus 220 (with apparatus 210 and 220 possibly being combined as one hardware element), the cutting apparatus 230, impregnation apparatus 240, curing apparatus, 250, and inflation apparatus 260. These apparatus may employ conveyor belts, stationary beds, and other means upon which to place materials 810, mechanical arms 820, dispensers 830, mixing vats 840, UV light emitters 850, and pressurized air 860, and other manufacturing devices.

Many of these hardware elements are controlled by the software 710, in some embodiments. The software 710 includes a control program 720, which includes both CNC positioning software 730 and 3D printing software 740, as well as the many masks described above: the bladder shape mask 270, the cutting mask 280, the impregnation mask 290, and the curing masks 310 and 320.

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. A composite structure manufacturing method to create a composite structure, the method comprising:
   stacking at least two sheaths comprising a predefined shape;
   melding the at least two sheaths in a pattern by applying heat and pressure to form a bladder capable of inflation;
   cutting away an area of the bladder to form a hole in the bladder;
   overlaying fabrics covering the hole on both faces of the bladder;
   impregnating at least the portion of the fabrics covering the hole with a resin-based compound to form impregnated fabric layers;
   making contact between the impregnated fabric layers to form a contact point;
   selectively curing the resin-based compound at the contact point to form a flat composite structure.

2. The composite structure manufacturing method of claim 1, further comprising inflating the bladder to form a composite structure that is no longer flat.

3. The composite structure manufacturing method of claim 1, further comprising employing a computer numerical control positioning system to selectively cure the resin based compound at the contact point.

4. The composite structure manufacturing method of claim 1, wherein the bladder forms a pathway within the composite structure.

5. The composite structure manufacturing method of claim 1, further comprising employing a computer numerical control positioning system to apply heat and pressure, cut away an area of the bladder, impregnate the fabrics, and selectively cure the resin-based compound.

6. The composite structure manufacturing method of claim 1, further comprising employing three-dimensional printing to impregnate the portion of the fabrics covering the hole with the resin-based compound.

7. The composite structure manufacturing method of claim 1, wherein the resin-based compound is selected from a group consisting of fire-retardant material, fire-resistant material, phase change material, solar-attracting material, heat-emitting material, heat-absorbing material, electrically conductive material, thermally conductive material, thermally resistant material, waterproof material, power-conducting material, and water-resistant material.

8. The composite structure manufacturing method of claim 1, wherein the at least two sheaths are plastic sheaths.

* * * * *